Feb. 10, 1931.                M. M. GOLDBERG                1,791,866
                                CASH REGISTER
                         Filed May 19, 1927    7 Sheets-Sheet 2

Inventor
Maximilian M. Goldberg
By
Carl Beust
Henry E. Stauffer
His Attorneys

Feb. 10, 1931. M. M. GOLDBERG 1,791,866
CASH REGISTER
Filed May 19, 1927 7 Sheets-Sheet 4

Inventor
Maximilian M. Goldberg
By
Carl Beust
Henry E. Stauffer
His Attorneys

Feb. 10, 1931.     M. M. GOLDBERG     1,791,866
CASH REGISTER
Filed May 19, 1927     7 Sheets-Sheet 5

FIG.12

| DATE | TIME | CHECK NO | | OPERATION NO | | |
|------|------|----------|---|------|---|---|
| DEC-5-25 | 11.0 | G121 | | 2450 | QU. START | 15.00 |
| DEC-6-25 | 9.0 | | RATE .40 | | QU. FINISH | 15.00 |
| | | | | | EARNINGS PW | 6.00 |
| | | | | | SU | 0.35 |
| DEC-6-25 | 7.0 | F345 | | 2451 | QU. START | 15.00 |
| DEC-6-25 | 2.3 | | RATE .27 | | QU. FINISH | 14.95 |
| | | | | | EARNINGS PW | 4.04 |
| | | | | | SU | 0.30 |
| DEC-6-25 | 7.0 | E136 | | 2452 | QU. START | 14.95 |
| DEC-7-25 | 9.3 | | RATE .35 | | QU. FINISH | 14.95 |
| | | | | | EARNINGS PW | 5.23 |
| | | | | | SU | 0.32 |
| DEC-10-25 | 7.0 | A478 | | 2453 | QU. START | 14.95 |
| DEC-10-25 | 3.2 | | RATE .45 | | QU. FINISH | 14.87 |
| | | | | | EARNINGS PW | 6.69 |
| | | | | | SU | 0.68 |

No. of Pieces... 1500
No. of Boxes... 5
Page No. 1236

Inventor
Maximilian M. Goldberg
By Pearl Beust
Henry E. Stauffer
His Attorneys

Feb. 10, 1931.   M. M. GOLDBERG   1,791,866
CASH REGISTER
Filed May 19, 1927   7 Sheets-Sheet 6

Inventor
Maximilian M. Goldberg
By Carl Beust
Henry E. Stauffer
His Attorneys Feb. 10, 1931.   M. M. GOLDBERG   1,791,866
CASH REGISTER
Filed May 19, 1927   7 Sheets-Sheet 7

Inventor
Maximilian M. Goldberg
By
His Attorneys

Patented Feb. 10, 1931

1,791,866

UNITED STATES PATENT OFFICE

MAXIMILIAN M. GOLDBERG, OF DAYTON, OHIO, ASSIGNOR TO THE NATIONAL CASH REGISTER COMPANY, OF DAYTON, OHIO, A CORPORATION OF MARYLAND

CASH REGISTER

Application filed May 19, 1927. Serial No. 192,709.

This invention relates to printing mechanism for accounting machines and more particularly to means for automatically positioning a card for printing.

The principal object of this invention is to provide a movable card holder for record material, and driving mechanism therefor, which after the card holder is set manually to any desired line, will cause the holder to be automatically adjusted to the next succeeding line during every printing cycle of operation.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

General description

This invention is especially adapted for use with the machine shown and described in the application of M. M. Goldberg, Ser. No. 115,998, filed June 14, 1926, and an understanding of the system used with that machine will be very helpful in considering the present invention. A short résumé of this system will be given herein.

The machine is chiefly used for making a record of piecework operations in factories. When a job is assigned to a workman, the machine is operated and the following data are recorded on the record strip in connection with each job: the date and the time when each job is started, the check number of the workman assigned to each job, the operation number, and the number of pieces comprising the job.

When the job is completed, the following data are printed: the date and hour when the job was finished, the rate of pay per hundred pieces, and the actual number of pieces finished, a deduction being made for any pieces spoiled. The machine then performs a multiplying operation to determine the amount due to the workman, and after this has been accomplished, it prints this amount on the third line. This ends the multiplying operation. The machine is given another operation to record the cost of setting up the job, and this amount is then printed on the fourth line.

In the above entitled application, the machine prints the data on a continuous strip. This strip is replaced in the present invention by a record card, which is much more convenient as all the entries concerning a certain operation can be placed together whereas on the strip this is impossible. The cards are also much more convenient for subsequent filing than the strip would be.

In the present invention, the record card holder is hinged at one end to enable it to be raised into a vertical position so that the card may be readily inserted therein; and so that the indexing finger for selecting the proper line to be printed upon may also be readily set. This arrangement is provided because the machine is constructed to print on the under side of the card, that is to say, the card when in the printing position is face down. But, by hinging the card holder at one end, it can be lifted into a vertical position so that the lines upon which the printing is to be made are visible to the operator.

After the card is inserted in the card holder, and the index finger is positioned to select the proper line for printing, the card holder is lowered to its horizontal position, ready to be shifted to a position determined by the index finger. In shifting the card holder manually toward the printing line, the index finger is connected to the card holder shifting mechanism, so that the index finger moves with the card holder to control the extent of movement of the holder. But, the machine to which this invention is shown applied, is so constructed that there is not enough space for the index finger to move the entire distance to properly position the selected line of the card at the printing line. For this reason the card holder cannot be shifted manually to move the card into the printing position. At the end of the manual shifting movement, the index finger is automatically disconnected from the card holder shifting mechanism.

Even though it were possible to manually shift the card to the printing line, it would be necessary to withdraw the index finger after the impression is made, so that the record may be line-spaced, and thereafter reindex the finger according to the new line to be printed upon, which is also done automatically. For this reason the index finger is held withdrawn to permit the machine to automatically complete the shifting movement of the card holder for printing and to line-space the printing card.

The line spacing is accomplished by shifting the card from the position to which it is manually set, to the printing line, and then returning the card to within one line space of the position to which the holder had been manually set, and in this manner the line spacing is effected.

The system used to illustrate and describe this invention is the same as that used in the above mentioned Goldberg application. In that system, it is necessary to remove the card from the card holder after the first line is printed. When the workman has completed the work assigned to him, the card is again inserted in the card holder, the index finger is positioned to select the proper line, and the card shifted according to the line on which the next data are to be entered, the movement being determined by the adjustment of the index finger. However, it is not necessary to manually index the card, after the first impression is made, after this second insertion of the card into the holder, since the card is line spaced automatically, and therefore, it is not necessary to shift the record back to its original position, but rather, it is left in the position to which it is shifted automatically by the machine.

When the invention is adapted to other systems, for example, a system in which the card is left in the card holder until all the lines on the card are filled, the card holder is never moved back to its original position, but it is shuttled back and forth between the position to which it was shifted originally by hand and the printing position, except that it is line-spaced during each return movement.

The machine is also provided with an automatic lock, which prevents the release of the machine after the last line of the card is printed upon, to notify the operator that the card should be removed and a new card inserted.

In order that the shuttle movements of the card holder may be better understood, a general description will be given of the movements of the card holder with particular reference to Fig. 19, wherein is shown, diagrammatically, the various movements of the card holder for two imprints upon the card, and also for one imprint upon the card.

Figures 8, 9, 10, 11, 19:
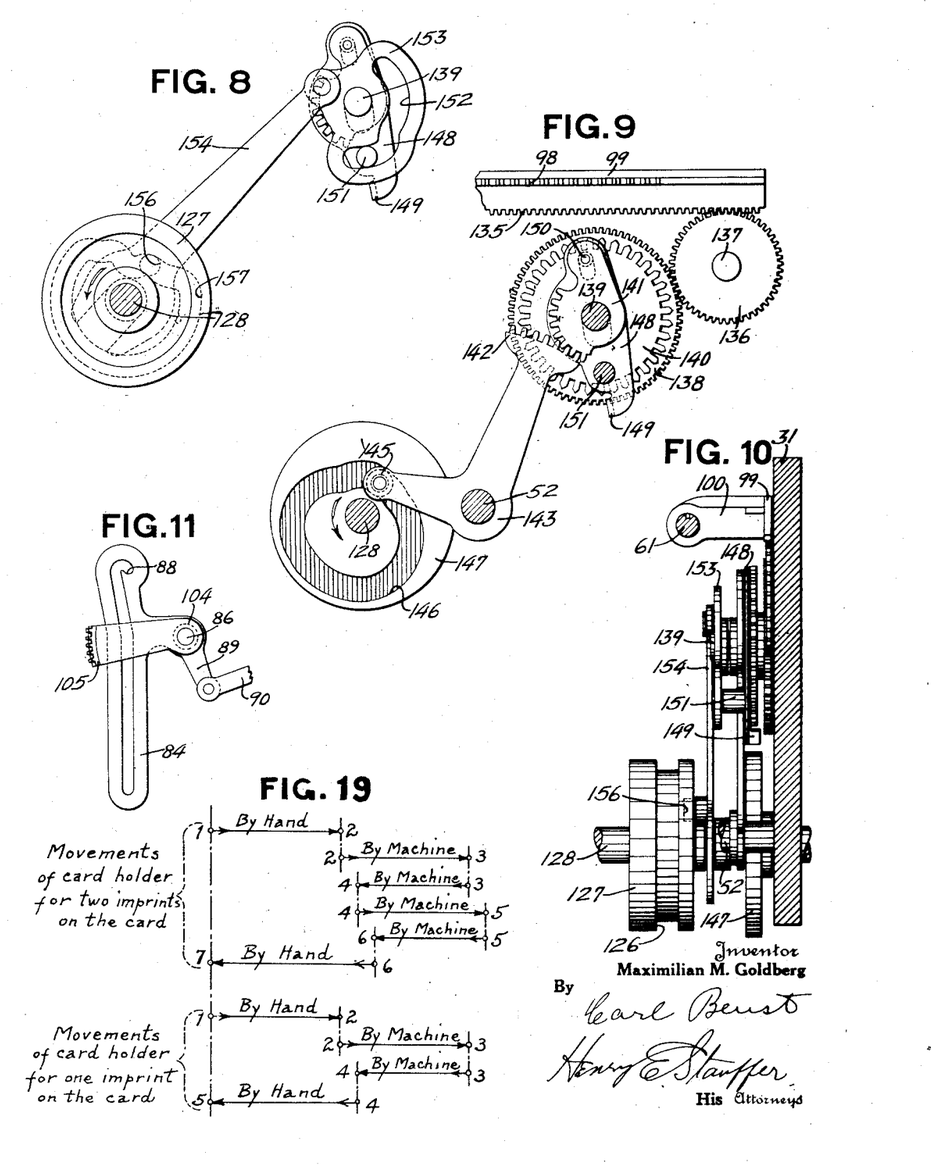
Fig. 8 shows the means for engaging and disengaging the card holder and its operating mechanism.
Fig. 9 is a detail view of the card holder operating mechanism.
Fig. 10 is a side elevation of the mechanism shown in Figs. 8 and 9 combined.
Fig. 11 is a detail view of part of the mechanism for raising the shield from the opening for the lower printer when the card holder is raised into its vertical position.
Fig. 19 is a diagram showing some of the various manual and machine driven movements of the card holder.

Referring to the upper part of Fig. 19, point 1 represents the normal position of the card holder. The holder is first moved by hand in the direction of the arrows to point 2. The index finger is then automatically disengaged from its aligning rack. From point 2, the holder is moved by the machine in the direction of the arrows to point 3. The printing is now done on the selected line. From point 3, the holder is moved toward the left in the direction of the arrows to point 4, which point is one step or one line space distant from point 2. Just after the card holder reaches point 4, the index finger is automatically engaged with the aligning rack. From point 4, the holder is moved in the direction of the arrows by the machine to point 5. Just before the card holder leaves point 4, the index finger is automatically disengaged from the aligning rack. The second impression is now made on the next line. The distances between points 2 and 3, and between points 4 and 5, are the same, as this movement is fixed. From point 5, the holder is moved by the machine to point 6, which is one step or line space distant from point 4. After the card holder reaches point 6, the index finger is again engaged with the aligning rack. If no more printing operations on the card are desired at this time, the holder and index finger are moved by hand from point 6 to point 7, which coincides with point 1, the normal position.

When it is desired to make only one impression upon the card, the movements of the holder will be as indicated by the lower half of Fig. 19, which movements are from points 1 to 2 by hand. The index finger is then automatically disengaged from its aligning rack. The holder is then moved from points 2 to 3 by machine, and the impression is made upon the selected line. The holder is then moved from points 3 to 4 by machine, point 4 being one step or line space distant from point 2. The index finger is now automatically engaged with its aligning rack, and the holder is then moved by hand from point 4 to point 5, which coincides with point 1, the normal position.

*Frame*

The mechanism of the printer to which this application relates, is supported upon a front frame 30 and a rear frame 31, joined at their left hand ends, as shown in Figs. 1, 3, 5 and 6, by a cross frame 32.

*Upper type line*

Figure 1:
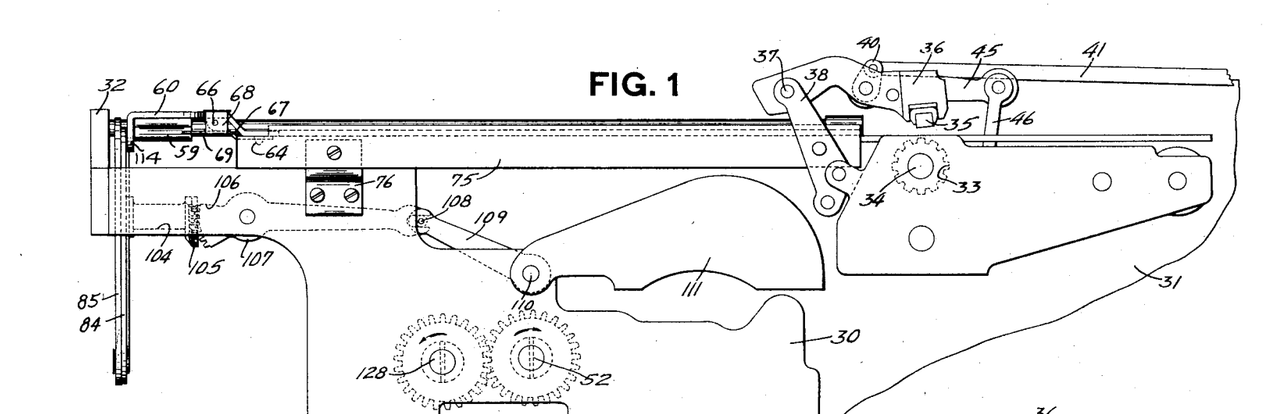
Fig. 1 is a front elevation of the printing mechanism.

The data are set up on type wheels 33, rotatably mounted on a shaft 34 (Fig. 1). These type wheels are set in the same manner as that shown in the above mentioned Goldberg application and reference may be made thereto for a full and complete description of this mechanism. The impressions are made by a plurality of platens 35, carried in a platen frame 36, pivoted on a shaft 37 supported by an arm 38, extending upwardly from a supplemental printer frame and by the rear frame 31. The platens which are to be operated on any particular operation are selected by a plurality of cams 42, (Fig. 3), indicated generally, fast on a shaft 39, supported by the platen frame 36 and adapted to be rotated by an arm 40 and a link 41, shown in Figs. 1 and 2. These cams are operated in accordance with the conditions set up in the main portion of the accounting machine. If it is desired to obtain a description of this mechanism the same may be found in the above mentioned Goldberg application.

Figure 2:
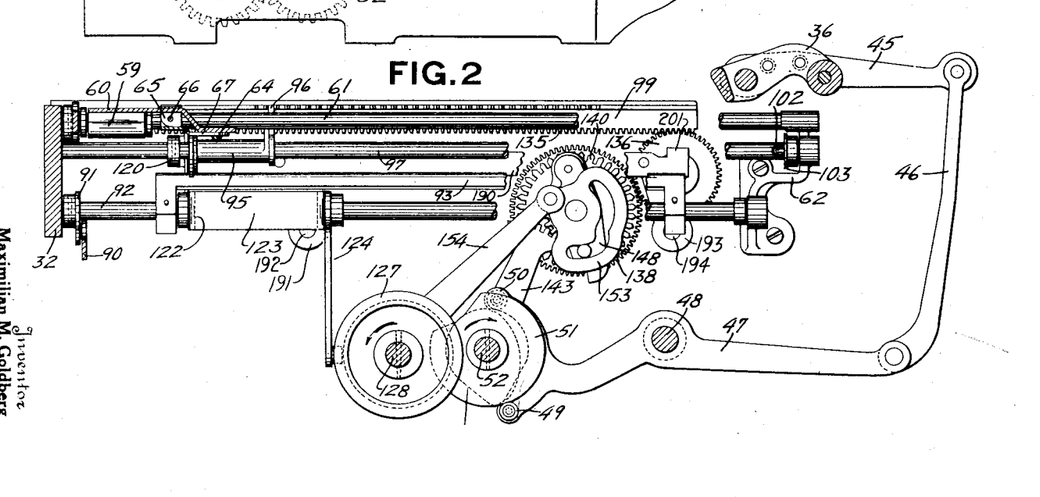
Fig. 2 is a front elevation of the movable card holder operating mechanism.
Figure 3:
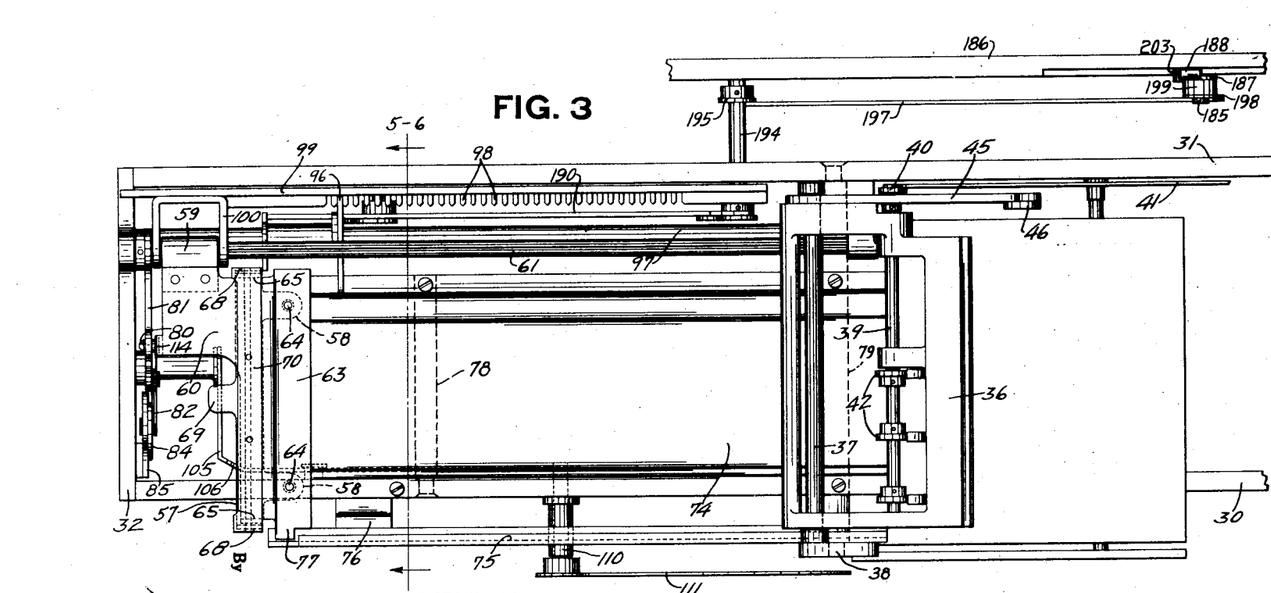
Fig. 3 is a top plan view of the printing mechanism.

When it is desired to take an impression from the type wheels, the platen carrying frame 36 is rocked clockwise about the shaft 37 by the following mechanism:

Secured to the inner end of the frame 36 is an arm 45 (Figs. 1, 2 and 3). Pivoted to the right hand end of the arm 45 is the upper end of a link 46, which at its lower end is pivotally connected to a lever 47, pivoted on a shaft 48. The left hand end of the lever 47 carries two rollers, 49 and 50, which co-operate with a pair of cams 51, fast on a shaft 52. The shaft 52 and the cams 51 are rotated in a clockwise direction by the main operating mechanism of the machine, and thereby rock the lever 47 first clockwise and then counter-clockwise. This movement through the link 46 and arm 45 will rock the platen carrying frame 36 first clockwise and then counter-clockwise to take an impression from the record material which has been placed between the platens 35 and the type wheels 33.

*Card holder*

The movable card holder, which forms a part of the mechanism for shifting and line-spacing the card, is best shown in Figs. 1, 2, 3 and 17.

The card holder includes a clamping plate 60 secured to a hinge 59 pivoted on a shaft 61 and arranged to slide thereon. This shaft is supported at its left-hand end, by the frame 32, and at its right-hand end by a bracket 62 secured to the frame 31. The front end of the clamping plate 60 terminates in a lip 77, (Figs. 3 and 17), resting on a ledge forming the bottom of a groove in a guide 75 supported on a bracket 76 and on the arm 38. The bracket 76 is carried by the frame 30.

The clamping plate 60 extends towards the right and is widened out to form a jaw 63 preferably as wide as the record card. This jaw 63 carries two card aligning pins 64, and also has two ears 65 supporting a rod 66.

Pivoted on this rod 66 below the jaw 63, to ears 68, is another clamping plate 67 having extensions 58 which form the lower jaw of the card holder. Each extension 58 has an aperture into which the pins 64 normally enter. The clamping plate 67 has a finger grip 69 (Figs. 1 and 3) by which said clamping plate 67 can be rocked clockwise about the rod 66 to lower the extensions 58, thus opening the jaws of the card holder for the reception or removal of a card.

Secured to the top of the clamping plate 60 (Figs. 3 and 17) is a flat spring 70 extending over the flat topped ears 68 of the lower clamping plate 67. The purpose of this spring 70 is to firmly hold a card between the jaws of the clamping plates 60 and 67.

Figure 12:
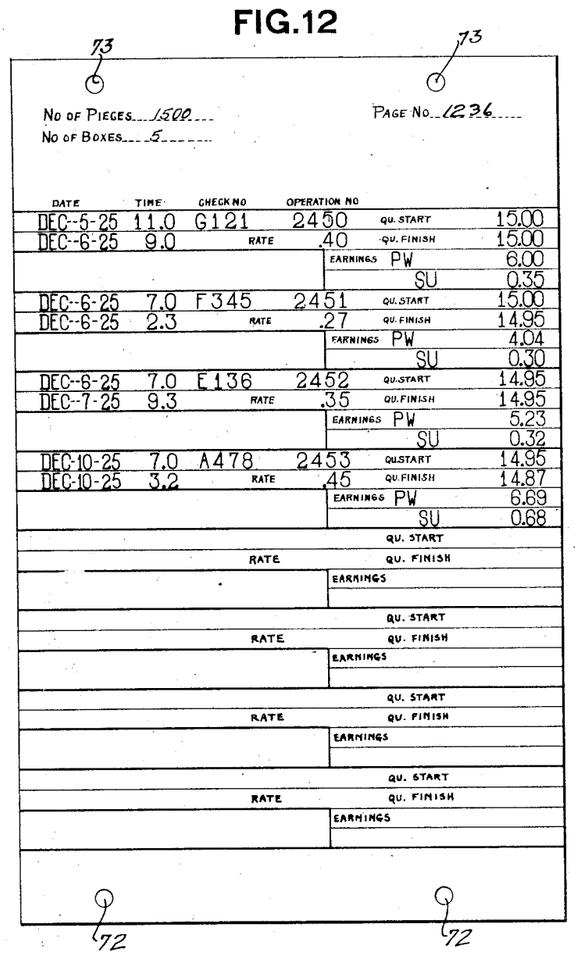
Fig. 12 is a facsimile of one of the record cards, which the machine is adapted to print upon.

In Fig. 12, there is shown a facsimile of one side of a record card, which is especially adapted for use with this machine. It is, of course, evident that this is not the only form of record material which could be used in connection therewith, and it is not desired to limit the invention to the particular form shown herein. This form of card, however, is especially adapted for use with this machine. In the bottom margin of the card there are cut two holes 72, by means of which the card is filed on the pins 64 of the card holder. When it is desired to place a card in the machine, the holder is rocked bodily on its hinge 59 about the shaft 61 until the clamping plates 60 and 67 are slightly past the vertical position where they will be held by mechanism which will be hereinafter described.

The rear face of the card is provided with the same form as the front face so that the card is reversible for printing on either face. The upper end of the card as shown in Fig. 12, is provided with two holes 73 which, with respect to the form on the rear side of the card, are located in the bottom margin and are provided for the same purpose as the holes 72.

When the holder is in the vertical position the operator presses the finger-grip 69 and rocks the clamping plate 67 clockwise to open the jaws of the card holder thus removing the apertures in the extensions 58 from the pins 64. The record card is then placed between the jaws of the card holder with the face to be printed upon toward the operator, and the two holes 72 in its lower margin are slipped over the two pins 64 on the jaw 63. The operator then releases the pressure on the finger grip 69 and the spring 70 closes the jaws of the card holder, and firmly holds the card in position. This method of holding the card prevents any lost motion or slipping which might occur during the movement of the holder, and also forms a simple aligning means to maintain the proper relation between the card and printing wheels.

Figure 18:
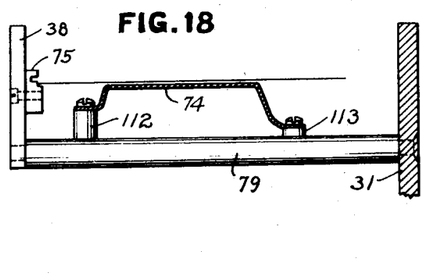
Fig. 18 is a detail view, in cross section, showing the method of mounting the right-hand end of the record card table on the framework of the machine.

After the card has been inserted, as above described, the holder is lowered to its horizontal position and the free end of the card will then rest upon an inverted U-shaped table 74. (Figs. 3, 17 and 18), supported at its left-hand end (Fig. 3) by a square stud 78 (Fig. 17) mounted in the front frame 30; and at its right-hand end (Fig. 3) by two studs 112 and 113 (Fig. 18) carried by a long stud 79 mounted between the back frame 31 and the platen frame arm 38. This table 74 supports the card as it is shifted endwise by the card holder.

During the operation of the machine the holder is moved to the right to position the card at the printing line, and means is provided to prevent raising the holder to its vertical position during the operation of the machine. This means includes the previously described guide 75 and the lip 77 which slides in the groove of said guide during the movement of the card holder to the right and back again. As can be seen in Fig. 3, when the card holder is in its normal left hand position, the lip 77 is not in engagement with the grooved guide 75, and therefore the holder may be raised. After the movement of the holder to the right commences, however, the lip 77 enters the groove in guide 75 and any vertical movement of the holder during the operation of the machine is prevented. This mechanism is also clearly shown in Fig. 5.

*Line selector mechanism*

The card holder, as previously described, has three distinct shifting movements, the first, a manual movement which varies in extent, as determined by an index finger 96 (Figs. 3, 4, 5 and 6), second, an invariable automatic movement in the same direction, and third, an invariable automatic movement in the reverse direction. Both invariable movements are effected by a cam 146 (Fig. 9). The first invariable movement brings the selected line into printing position, and the second invariable movement lines spaces the card.

Figure 4:
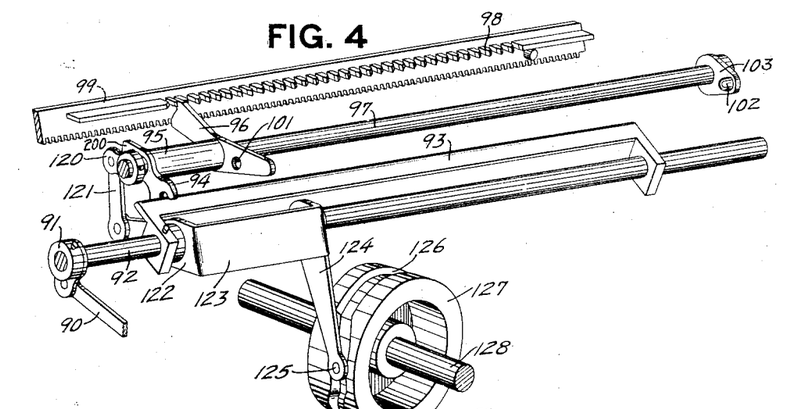
Fig. 4 is a detail perspective view of the mechanism for operating the selecting arm.
Figure 5:
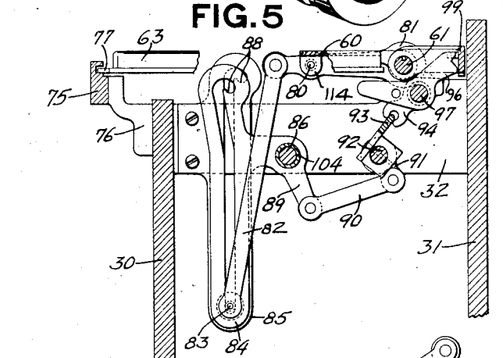
Figs. 5 and 6 show in normal and in moved positions, respectively, the means for removing the selecting arm from operating position when the card holder is raised.
Figure 6:
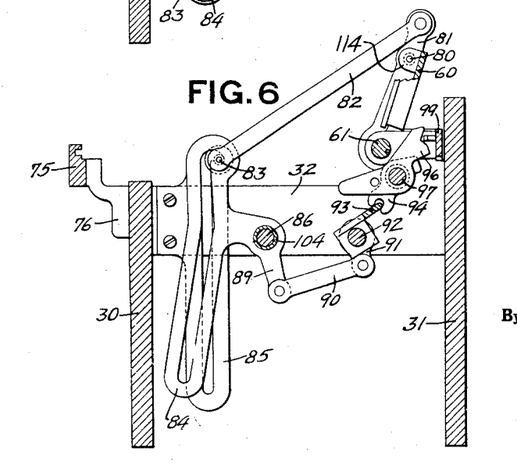

The means by which the line to receive the impression is selected, will now be described. An index finger 96 (Figs. 2 to 6) is slidably and pivotally mounted upon a shaft 97 supported by the frame 32 and bracket 62. When the card holder is in its normal position the index finger 96 is in engagement with aligning teeth 98 on a rack 99. This rack 99, near one end thereof, is secured to a yoke 100 (Figs. 3 and 10) slidably mounted upon the shaft 61. The yoke straddles the ends of the clamping-plate hinge 59. When the parts are in their normal positions, the rack 99, near its other end, meshes with a gear 136, the function of which will be later described. When the holder is raised into its vertical position, the following described mechanism is actuated, to remove the index finger 96 from the teeth 98 to permit the adjustment of the rack 99 according to the new line selected. This mechanism is shown in Figs. 1, 3, 5 and 6. Projecting from an ear 114 on the clamping plate 60 is a pin 80, which extends through an opening in an arm 81, fast on the shaft 61. Pivoted to the opposite end of the arm 81 is a link 82, which at its lower end carries a pin 83 projecting through a cam lever 84 and a slotted guide 85. The slotted guide 85, as shown in Figs. 5 and 6, is secured to the frame 32, and has no movement whatever. The cam lever 84, however, is pivoted on a stud 86 projecting from the frame 32. When the holder is in its horizontal position, as shown in Fig. 5, the pin 83 is in the lower ends of the slots in the lever 84 and guide 85. When the card holder is raised, however, the pin moves upwardly in the slots in the cam lever 84 and guide 85, and as the slot in the cam lever 84 is slightly angular near its upper end, the cam lever 84 is rocked clockwise, due to the fact that the guide 85 is held stationary. When the pin reaches the upper ends of the slots in both the lever 84 and the guide 85, seats itself in notches 88 in both the cam lever 84 and the guide 85, the notches at this time being in alignment. The notch 88 of the guide 84 now maintains the card holder in its raised position, as illustrated in Fig. 6. When it is desired to lower the holder, after a card has been placed therein, the left hand end of the link 82 must be moved manually, to withdraw the pin 83 from the notches 88.

The cam lever 84 has a downwardly extending arm 89, connected by a link 90, to an arm 91 (Figs. 4 to 6) fast on the left hand end of a shaft 92, supported by the frame 32 and the bracket 62. Fast on the shaft 92 is a long yoke 93, the edge of which enters the bifurcated end of a short arm 94, best shown in Fig. 4. The arm 94 is connected by a sleeve 95 to the index finger 96.

When the card holder is raised from the position shown in Fig. 5, to that shown in Fig. 6, and the lever 84 is rocked clockwise, as above described, the link 90 and arm 91 will rock the shaft 92 in a clockwise direction. As the yoke 93 is fast on the shaft 92, it will also be rocked clockwise and will rock the arm 94, sleeve 95 and index finger 96 counter-clockwise, thereby withdrawing the rear end of the index finger from between the teeth 98 of the rack 99. The index finger 96 which is now accessible to the operator and free to be moved axially, is then slid toward the right on the shaft 97 until the rear end thereof is opposite the desired line on the record card, which is visible to the operator with the holder in its raised position.

After this is done the holder and card are once more lowered to their horizontal positions, whereby the index finger 96 enters between the teeth 98, corresponding with the line to be printed upon.

The card holder is then slid to the right (Figs. 1 to 4). The rack 99 and index finger 96 are shifted with the holder until the index finger 96 is stopped by coming into contact with an arm 103, secured on a shaft 97. A pin 102, on the arm 103, passes through an opening 101 in the index finger. When the finger 96 is in this position, the arm 94 no longer engages the yoke 93, and, therefore, the arm 94 and index finger 96 are free to be rocked by the arm 103, in a manner to be hereinafter described, to disengage the finger 96 from the teeth 98. The machine is now ready to be operated, but the record card is not yet in position to be printed upon, it being merely located, with its selected line for printing, a fixed distance from the printing line. A shifting mechanism completes the shifting movement of the card during the operation of the machine. As previously stated, the manual shifting of the card is variable, determined by the line upon which the printing is to be made, and is limited by the position to which the index finger 96 is set. The method of setting the index finger is novel and simple. While the card is held in its vertical position, the ends of the lines upon which the printing is to be performed are adjacent the index finger, and therefore, all the operator need do is slide the index finger along its shaft until it is opposite the line to be selected.

After the holder and card have been shifted until the index finger contacts the arm 103, said index finger has completed its function and is then disconnected from the rack 99, by the means which rocks the arm 103, to permit the rack 99 to shift the card to the printing position. It might be desirable to shift the card to the printing line maually in some machines, but in the machine to which the invention is shown applied, there is no room for the index finger, and, inasmuch as it is necessary to disconnect the finger 96 from the teeth 98, before the rack 99 can shift the card for line-spacing, applicant disconnects the index finger from the teeth at the time the card is in its manually moved position. The shifting mechanism, therefore, shifts the card without further moving the index finger. The automatic shifting of the record card to the printing position is later described.

*Lower printer shield*

The machine disclosed in the above mentioned Goldberg application is provided with a lower printer, not shown herein. An opening is provided through which the record material is inserted into that machine. In multiplying, the machine performs a series of cycles of operations, during which the record carriage is shuttled back and forth. It has been found that the operator sometimes, either thoughtlessly or accidentally, places his hand into this opening during the operation of the machine, and when the carriage shifts or the printing hammer operates, injury to the operator results. To guard against such accidents, a shield is provided which covers the opening of the lower printer, when the record card and the holder of the upper printer are in their horizontal positions. The shield is removed when the upper record card holder is raised to its vertical position, as above described. The shield and its moving means will now be described.

Fast on the cam lever 84 (Figs. 1, 5, 6 and 11) is a hub 104, which carries a segment gear 105, meshing with a segment gear 106, carried by one end of a lever 107, pivoted on the frame 30. At its opposite end the lever 107 is bifurcated and co-operates with a pin 108, carried by an arm 109 fast on a shaft 110, also supported in the frame 30. At its forward end the shaft 110 carries a shield 111 which normally covers the opening into which record material is inserted in the lower printer (not shown). When the holder is raised to its vertical position and the cam lever 84 is rocked counter-clockwise, the segment 105 is also rocked clockwise. This will cause the lever 107 to be rocked clockwise and the arm 109 will be rocked counter-clockwise. This will raise the shield 111 a sufficient distance to uncover the opening in the lower printing mechanism.

*Operating mechanism*

Figure 7:
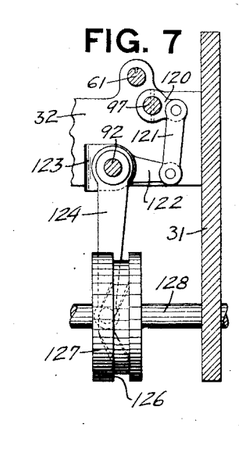
Fig. 7 is a detail view of the cam and part of the connections for operating the line selecting arm.

After the index finger 96 is positioned opposite the line upon which the next impression is to be made and the card holder lowered and moved to the right until the index finger 96 contacts the arm 103, the movement of the holder and card is controlled automatically by the mechanism of the machine. In this position of the holder, the arm 94 is disconnected from the yoke 93. After the operation of the machine commences, the first thing that happens is that the index finger 96 is removed from its engagement with the teeth 98 on the rack 99 to permit adjustment of the holder and rack 99 independently of the index finger, so that the card can be moved to the printing position automatically. This is accomplished in the following manner:

It will be recalled that the arm 103 is fast on the shaft 97. Also fast on the left hand end of this shaft, as viewed in Fig. 4 is an arm 120, to which is pivoted one end of a link 121, secured at its lower end to an arm 122 pivoted on the shaft 92, and connected by a yoke 123 with a downwardly extending arm 124 also pivoted on the shaft 92. This arm carries a roller 125, which entered a cam groove 126 cut in a drum cam 127, fast on a shaft 128, supported by the frames 30 and 31 of the printing mechanism. This shaft 128 is driven by the mechanism of the machine proper and receives one counter-clockwise rotation, as viewed in Fig. 4, during each cycle of operation. The shaft 52 (Fig. 2) hereinbefore referred to is driven from the shaft 128 by gears as shown in Fig. 1. The conformation of the cam groove 126 is such that at the beginning of an operation the arm 124 is rocked counter-clockwise as viewed in Fig. 7. This movement of the arm 124 will, through the yoke 123, rock the arm 122 also counter-clockwise, and raise the link 121, thereby rocking the arm 120 and shaft 97 also in a counter-clockwise direction. The arm 103 will, therefore, be rocked clockwise, as viewed in Fig. 4, and due to the fact that the pin 102 carried by the arm 103 extends through the hole 101 in the index finger 96, the index finger is also rocked clockwise, and disengaged from the teeth 98. The holder and the rack 99 are then free to be moved farther toward the right independently of the index finger 96, which remains stationary in order to position the record material at the correct point to receive the impression on the line selected previously. This movement of the holder to the printing line is accomplished in the following manner:

The rack 99 is provided with teeth 135 (Figs. 2 and 9), on its lower edge, which teeth mesh with a gear 136, mounted on a stud 137 projecting from the frame 31. The gear 136 meshes with another gear 138 rotatively mounted on a stud 139 also carried by the frame 31. Secured to the side of the gear 138 is a toothed wheel 140. Loosely mounted on the stud 139 is a segment gear 141, in engagement with a segment gear 142, formed on the end of one arm of a bell crank lever 143, pivoted on the shaft 52, supported by the frames 30 and 31. The other arm of the bell crank lever 143 carries a roller 145, which co-operates with a cam groove 146 cut in the side of a cam 147 fast on the shaft 128, previously described.

Slidably mounted on the stud 139 (Figs. 8, 9 and 10) between the segment gear 141 and the toothed wheel 140, is a slide 148, which has an ear 149 bent at right angles thereto. This ear 149 is adapted to co-operate with the toothed wheel 140. At its upper end the slide 148 has an opening through which extends a pin 150, carried by the segment gear 141. After the operation of the machine commences, mechanism is operated which raises the slide 148 a sufficient distance to bring the ear 149 on the lower end thereof into co-operative relation with the toothed wheel 140. It can be seen that this will connect the driving mechanism, comprising the bell crank lever 143 and cam 147 to the gear 138, so that when the cam 147 begins its counter-clockwise rotation, the bell crank lever 143 is rocked clockwise, which will rock the segment gear 141, the slide 148, toothed wheel 140 and gear 138 counter-clockwise. This movement will rotate the gear 136 clockwise, and will move the rack 99 toward the right to printing position. The extent of movement given the rack 99, the card holder and the record card, by the cam race 146, to bring the selected line to the printing position is always the same.

Means for raising the slide 148 at the appropriate time to connect the driving mechanism with the gear 138, will now be described. The slide 148 (Fig. 8) carries a pin 151, projecting laterally therefrom through a cam slot 152, cut in a cam arm 153, pivoted on the stud 139. Pivoted to the cam arm 153 is the upper end of a pitman 154, which at its lower end is bifurcated and straddles the shaft 128. The pitman 154 carries a roller 156, which co-operates with a cam groove 157 formed in the side of the box cam 127, previously described. At the beginning of the operation of the machine before the cam race 146 becomes effective to drive the bell crank 143, the pitman 154 is raised, thereby rocking the cam arm 153 clockwise about the stud 139. The cam groove 152 is so formed that this movement of the cam arm 153 raises the slide 148 a sufficient distance to bring the ear 149 thereof into engagement with the toothed wheel 140, thereby effecting the connection between the driving mechanism and the card holder to shift the card to the printing position.

The clockwise movement of the bell crank lever 143 under control of the cam 147 shifts the holder to the right, as above described, to bring the selected line to the printing position. After the impression has been made on this line, the bell crank lever 143 is rocked counter-clockwise, to return the card folder to a position which is one line farther toward the right than the position it previously occupied. This is necessary in order to line space the card to select the next succeeding line for the next operation. This is accomplished in the following manner.

The cam race 146 is so formed, that after the impression is made upon the selected line, it will rock the bell crank 143 clockwise (Fig. 9) and the segment gear 141 counter-clockwise toward their original positions, and since the ear 149 of the slide 148 is maintained between the teeth of the wheel 140, the rack 99, together with the card holder, and record card, are returned toward the positions they assumed at the beginning of the operation of the machine, namely, their manually shifted positions. However, when the card has been returned to within one linespace of this last-named position, a dwell in the cam race 146, stops further movement of the card and card holder. At this time, the cam race 157 shifts the pitman 154 back toward its original position to rock the cam arm 153 and to shift the slide 148, to withdraw the ear 149 from between the teeth of the wheel 140. After the withdrawal of the ear 149 has been effected, the cam race 146 completes the return movement of the bell crank 143, segment gear 141 and the rocking movement of the slide 148. Since, at this time, the driving connection between the cam 147 and the rack 99 is disconnected, this last movement of the slide 148 is not transmitted to the rack 99 and record card holder, and thus the card will stop one line-space short of the position from which it started. Thus, this mechanism not only effects the shuttling of the card back and forth to the printing position, but it also effects the line spacing of the card.

After the record card and the rack 99 comes to its line-spaced position, the cam race 126 (Fig. 4) rocks the arm 124 to re-engage the index finger 96 with the teeth 98 in the newly adjusted position, which, as just mentioned, is one space removed from the one to which it was manually adjusted.

On each succeeding cycle of operation of the printing mechanism, the card holder will be moved to the right a distance which will bring the next succeeding blank line into position to receive the impression and back again toward its starting point, and during each return movement the card will be linespaced as above explained. This will continue until the index finger 96 receives a different manual adjustment.

Release interlocking mechanism.

Before the machine is released for operation, it is necessary to position the card holder to the right, as described above, to engage the opening 101 in the index finger 96 (Fig. 4) with the pin 102 on the arm 103 pinned to the shaft 97. To insure that the card holder is correctly positioned before the machine is operated, mechanism is provided which prevents the release of the machine until the card holder is moved to the right as far as it will go which movement, as above mentioned, is limited by the contacting of the index finger 96 with the arm 103.

Figure 14:
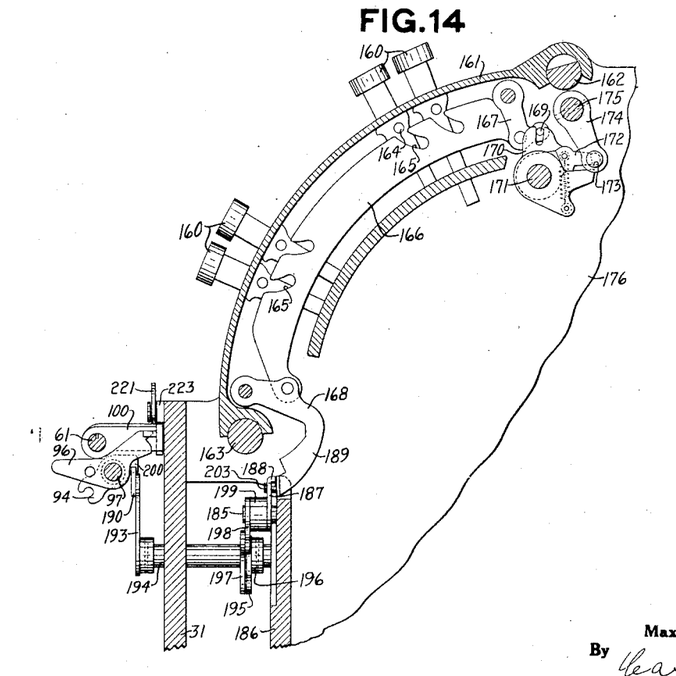
Fig. 14 is an interlock which forces the operator to correctly position the card holder before the machine can be released for operation.

As shown in Fig. 14, the machine is normally locked and is released for operation by depressing one of the keys 160. These keys are mounted in a frame 161 supported in the machine by two cross rods 162 and 163. Each of the keys 160 has mounted therein a pin 164, which co-operates with a slot 165 in a releasing bar 166, swung at its upper end on an arm 167 and at its lower end on an arm 168. The arm 167 has a projection which carries a pin 169 projecting into a slot formed in an arm 170 free on a shaft 171. Also free on the shaft 171 and secured to the arm 170 is a releasing pawl 172 normally lying in the path of a flattened stud 173 mounted in an arm 174 pinned to a shaft 175 supported by the left side frame 176 of the machine and the right side frame, not shown. The shaft 175 is the usual releasing shaft with which machines of this type are provided. This shaft is constantly urged in a clockwise direction by a strong spring, not shown herein, but which is fully illustrated and described in the above referred to Goldberg application. The releasing shaft 175 is held in its normal position by the engagement of the stud 173 with the nose of the pawl 172.

When a key 160 is depressed, the pin 164 thereon engages the corresponding slot 165 in the bar 166 and causes the bar to be moved in a downward direction. The downward movement of the bar will move the arm 167, pin 169 and arm 170 and rock the pawl 172 counter-clockwise out of the path of the stud 173, whereupon the shaft 175 will be rocked clockwise to release the machine for operation.

Figure 13:
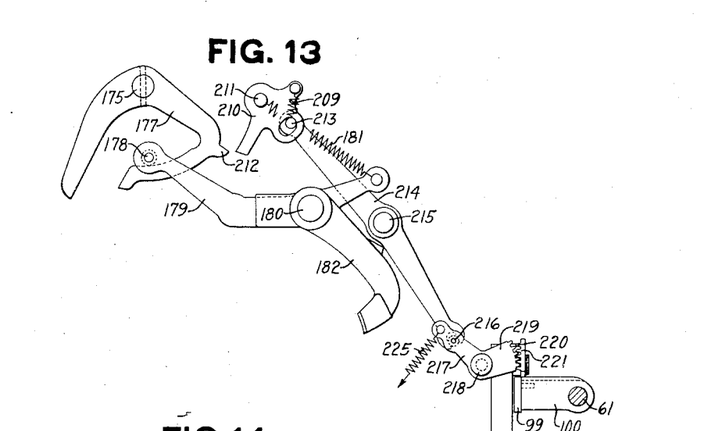
Fig. 13 shows an interlocking mechanism which prevents the releasing of the machine after an impression has been made on the last line of the card.

As viewed in Fig. 13, the releasing shaft 175 is rocked counter-clockwise to release the machine for operation. Pinned to the shaft 175 at its left hand end is a curved arm 177 (Figs. 13 and 16) the inner periphery of which co-operates with a pin 178 mounted in an arm 179 pivoted on a stud 180 projecting from the left side frame 176 of the machine, to retain the arm 179 in its normal position against the tension of a spring 181, as shown in Fig. 13. Integral with the arm 179 is a locking arm 182, which normally engages the motor clutch mechanism in a manner old and well known in the art.

When the shaft 175 and the arm 177 are rocked counter-clockwise, the arm 177 will pass from underneath the pin 178 whereupon the spring 181 will rock the arm 179 and the locking arm 182 counter-clockwise out of their locking positions and thereby permit the motor to drive the machine.

As mentioned above, it is desired to lock the machine against release until the card holder has been moved to its extreme right hand position in which the index finger 96 contacts the arm 103. Mechanism provided for this purpose will now be described.

Figure 15:
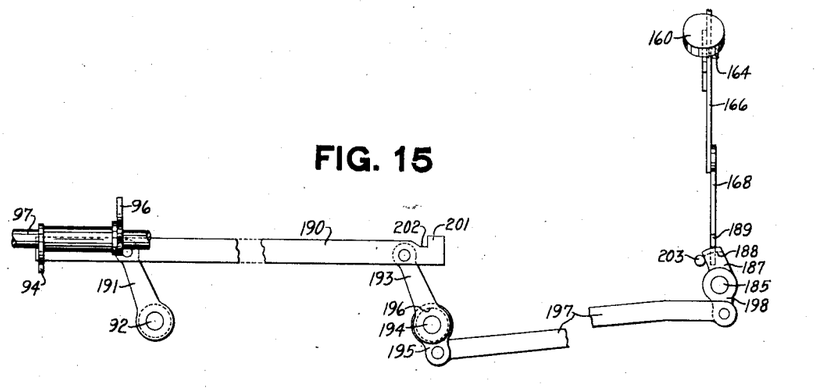
Fig. 15 is a front view of a part of the mechanism shown in Fig. 14.

Pivoted on a stud 185 mounted in a frame 186 is an arm 187 (Figs. 14 and 15) having a flange 188 co-operating with a tail 189 on the arm 168, which supports the releasing bar 166 at its lower end. The arm 187 is normally in the path of the tail 189, preventing a clockwise movement of this arm and the downward movement of the bar 166, thus locking the machine against release until the arm 187 is removed from the path of the tail 189. This is accomplished by the following mechanism.

A bar 190 (Figs. 2, 3, 14 and 15) is supported near its left hand end on an arm 191, pivoted on a stud 192 mounted in the frame 31, and near its right hand end by a similar arm 193, mounted on a short shaft 194 supported in the frames 31 and 186. An arm 195 is secured to a hub 196 pinned to the short shaft 194 near its right hand end, as viewed in Fig. 14. The arm 195 is connected by a link 197 to an arm 198, rigidly connected by a hub 199 to the arm 187, previously mentioned. Co-operating with the upper edge of the bar 190 is a projection 200 (Figs. 4 and 14) of the arm 94, which is connected by a sleeve to the index finger 96.

It will be remembered that after the card is inserted in its proper position the card holder is lowered to its horizontal position and moved manually to the right as far as it will go, such movement being limited by the arm 103. As the card holder nears its extreme right hand position the projection 200 (Fig. 14) on the arm 94 will engage the left side of an upwardly extending shoulder 201 (Fig. 15) of the bar 190 and move the bar to the right until the movement of the card holder is arrested by the index finger 96 contacting with the arm 103 pinned to the shaft 97.

The movement of the bar 190 to the right will cause the arm 193, shaft 194 and arm 195 (Fig. 15) to rock clockwise, which through the link 197, will rock the arm 198 and the arm 187 clockwise to remove the flange 188 of the arm 187 from the path of the tail 189 of the arm 168, thus permitting the keys 160 to be depressed to release the machine for operation. As the bar 190 is moved to the right, the notch 202 formed therein, engages the shoulder 200.

After the operation is completed, and when it is desired to remove the card from the holder, the card holder is first moved to the left to withdraw the lip 77 from the groove in the guide 75, so that it may be raised to its vertical position so that the card can be removed by spreading the jaws 63 and 58 by exerting pressure on the finger piece 69. As the card holder is moved to the left, the shoulder 200 will, through its engagement with the notch 202 in the bar 190, move the bar 190 to the left until the projection 200 is clear of the notch. This movement of the bar to the left will restore the arm 187 to its locking position in the path of the tail 189. The shoulder 200 then slides along the upper edge of the bar 190, maintaining the parts in the positions shown in Fig. 15, until the card holder is again manually moved to its selected position.

A stud 203 projecting from the frame 186 and into the path of the arm 187 limits the counter-clockwise movement of this arm and consequently the movement of the bar 190 to the left.

Another interlock is provided to prevent release of the machine after an impression has been made upon the last line of the card. This interlock is controlled by the position of the yoke 100, (Fig. 3), which is moved with the rack 99 to shift the card into printing position. The yoke 100 is so located, relatively to the card, that after the last line has been printed upon, and the card is automatically shifted to its manually selected position, the yoke 100 controls a latch for locking the releasing shaft 175 against releasing movement. It is to be understood that this locking of the releasing shaft becomes effective when the card is automatically returned toward the position to which it was set under control of the index finger 96.

Figure 16:
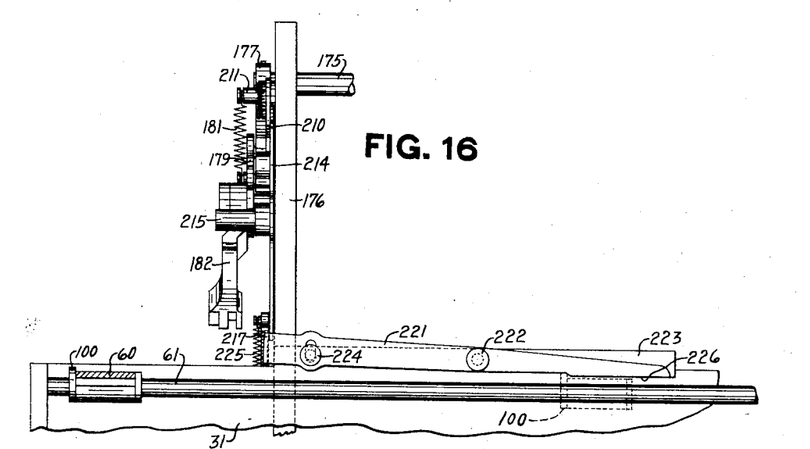
Fig. 16 is a front view of the mechanism shown in Fig. 13.
Figure 17:
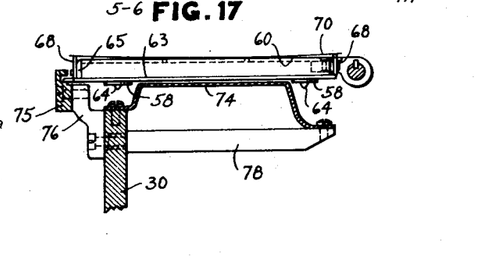
Fig. 17 is a detail view, in cross section, showing the method of mounting the left-hand end of the card table on the framework of the machine, and also shows a right-hand elevation of the record card's clamp or holder and its mounting on its supporting shaft.

This locking mechanism is shown in Figs. 13 and 16 and includes a pawl 210 pivoted on a stud 211 mounted in the frame 176. Formed on the arm 177 (Fig. 13) is a shoulder 212 with which the pawl 210 is adapted to cooperate to prevent counter-clockwise movement of the arm 177 and the shaft 175 to release the machine. The pawl 210 is normally held in its ineffective position by means of a pin 213 carried by a lever 214, said pin projecting into an opening formed in the pawl. The lever 214 is pivoted on a stud 215, mounted in the frame 176 and is bifurcated at its lower end to engage a pin 216 carried on an arm 217 pivoted on a stud 218 projecting from the frame 176. Integral with the arm 217 is a segment gear 219 meshing with teeth 220 carried on the end of a long lever 221 (Fig. 16) pivoted on a stud 222, projecting from a bar 223 secured to the printer frame 31. Near its left hand end the lever is guided by a headed stud 224, mounted in the bar 223, for the purpose of holding the teeth 220 on the lever in mesh with the teeth on the segment gear 219.

The parts just described are retained in their normal ineffective positions, as shown in Figs. 13 and 16, by means of a spring 225, one end of which is secured to a pin in the arm 217, the other end being secured to a pin, not shown, on the frame 176.

It will be recalled at this time that shortly after the beginning of the operation of the machine, the shaft 97 (Figs. 4 and 7) is rocked to remove the index finger 96 from co-operative relation with the teeth 98 on the rack 99. Immediately thereafter the carriage is moved farther to the right by mechanism described above and shown in Fig. 9, in order to position the record material at the correct point to receive the impression on the previously selected line. After the impression has been made the carriage is moved to the left a distance the space of one line less than the distance it was moved to the right. This, as described above, is for selecting the next succeeding line for the subsequent operation. If, however, the line selected previous to the operation was the last line on the card the line selected automatically for the following operation will be the position below the last line. As it is not desirable to print in this position, the mechanism just described, and operated as follows, will lock the machine against release after the impression has been made on the last line.

When the card holder is positioned to the right manually, the yoke 100 (Figs. 3, 10, 13 and 16) is moved to the position shown in dotted lines in Fig. 16. The conformation of the right hand end of the lever 221 is such that as soon as the card holder is moved farther to the right by the machine, the left hand arm of the yoke 100, being slightly larger than the right hand arm thereof, will contact a cam edge 226 of the lever 221 and rock the lever counter-clockwise. This movement, through the gear teeth on the left hand end of the lever meshing with the segment gear 219, will rock the arm 217 clockwise, and the lever 214 counter-clockwise. As this lever moves counter-clockwise, the pin 213 mounted in the upper end thereof will move down and the spring 209 stretched between the pin 213 on the lever and a pin mounted in the pawl 210, will cause the pawl to rock clockwise. As the arm 177 (Fig. 13) has been previously rocked counter-clockwise to release the machine, the left side of the pawl 210 will merely contact the shoulder 212 on the arm 177 and stretch the spring 209. Since the card holder is moved to the left by the machine one step less than it is moved to the right for line spacing as previously described, it is clear from Fig. 16 that the last line having previously been selected, the arm 100 will not be removed from under the edge 226 of the lever 221. The left side of the pawl 210 will, therefore, be maintained in contact with the shoulder 212 on the arm 177 by the spring 209. Near the end of the operation this arm 177 is rocked clockwise past normal position to release the depressed keys. As the shoulder 212 passes the end of the pawl 210, the pawl will be rocked clockwise by the spring 209 to a position in the path of the projection 212. Clearly this will obstruct the counter-clockwise movement of the arm 177 and shaft 175 and prevent release of the machine for a subsequent operation. However, as soon as the card holder is moved to the left for the purpose of placing a new card therein, the arm of the yoke 100 is removed from its position under edge 226 of the lever 221, whereupon the spring 225 (Fig. 13) will act to restore the parts to their normal ineffective positions.

After placing a fresh card in the holder, the operation will proceed as described above.

*Operation*

A very brief description of an operation of the mechanism as used in the machine disclosed in the co-pending Goldberg application referred to, will now be given, special reference being made to the facsimile of the record card shown in Fig. 12. In the first example given on the card shown in Fig. 12, the data Dec.—5—25 11.0 G121 2450 15.00 on the first line are printed when the particular job is assigned to the workman. The card holder is raised to its vertical position, the finger piece 69 is operated to remove the clamping plate 67 from co-operation with the pins 64 and the card is inserted faced toward the operator. The operator then moves the index finger 96 so that it is opposite the first line of the card or the line to receive the impression. The holder is then lowered and moved as far as it can go toward the right, limited by the contact of the index finger 96 with the arm 103. The operation is then begun. The date, December 5, 1925, is printed, the time—eleven o'clock in the morning, the workman's check number—G-121, the consecutive number of the operation—2450, and the number of pieces to be operated on, which is 1500. The card is then removed from the machine and filed. The operation of this job takes the balance of that day and is not finished until 9 o'clock on December 6. When the workman turns in the job as completed, the card is once more inserted in the machine and the adjusting or index finger is moved to select the second line. The card holder is then lowered to its horizontal position and moved to the right, as far as it can go until stopped by the arm 103. The operation is then commenced.

During the first cycle of this operation the date—December 6—is printed, then the time when the job was completed, which is 9 o'clock, the rate per hundred pieces, which is forty cents, and the number of pieces actually completed, in this case, 1500. This data is printed during the first cycle of operation and the machine then continues through a varying number of multiplying cycles, and after the multiplication has been finished, the result, which is the amount due the operator, is printed on the third line. This amount is $6.00. No further manual adjustment of the card holder has been necessary to print this amount on the third line, as this line has been automatically selected by the machine. The printing of $6.00 completes the multiplying operation.

There is still, however, one single cycle operation, which must be accomplished in order to complete the record. There is a certain cost incurred to set up the machinery to perform the operation above recorded, and this cost is recorded on the fourth line by a single cycle operation of the machine. In this case it is thirty-five cents. The selection of the fourth line to receive this impression is made automatically, and no further manual operation of the card holder is necessary to complete this record. A complete record of this operation is now printed on the first four lines of the card.

The same card can contain successive operations necessary to finish the parts being manufactured. Also, it can be used to record operations on mis-inspection of parts. In any event, the entries made when the jobs are assigned, can be put down in their proper places by adjusting the index finger manually. When the jobs are turned in and it is necessary to print on three successive lines in order to complete the record of each job, all that is necessary is to adjust the index finger for the first desired line, the other two lines being automatically selected by the machine.

In the above operation, the card and system disclosed in the co-pending Goldberg application was used by way of illustration, and in that machine it is never necessary to line-space more than two times to make a complete entry, this being governed by the printing mechanism disclosed in the co-pending application. The card is line-spaced after each printing operation, and since there is never more than three printing operations required to make an entry, two line-spacing operations are all that are ever needed in this particular system. However, the invention disclosed herein may be used in other systems, such as, for example, those wherein it may be desired to print data on the card successively until the card has become filled. In such an event the operation of the invention varies slightly from that just given.

If the card is to be used in a system where the card is to be left in the machine until the card is filled, the operator will raise the card holder, and insert the card therein, and set the index finger to select the first or top line of the card. After lowering the card holder into position, the operator moves the card and holder until stopped by the arm 103. This completes the manual adjustment of the card until the last line is printed upon, and after each printing operation the card is shifted to the left toward its last position, and during the movement it is line-spaced. After the last line is printed upon and the card is line-spaced to a position past the last line, the machine is automatically locked to prevent operation thereof.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed is:

1. In a machine of the class described, the combination of a holder adapted to hold record material, a rack fast on said holder, a gear meshing with said rack, a second gear meshing with said first mentioned gear, a toothed wheel secured to said second mentioned gear, a shaft supporting said wheel, a driving member loose on said shaft, and means for connecting said driving member and said toothed wheel in order to shift said holder a certain distance on each operation towards the printing line and back again.

2. In a machine of the class described, the combination of a holder adapted to hold record material, a rack fast on said holder, a gear meshing with said rack, a second gear meshing with said first mentioned gear, a toothed wheel secured to said second mentioned gear, a shaft supporting said wheel, a driving member loose on said shaft, and a slidable member having a slot and pin connection with said driving member and also having an ear adapted to cooperate with said toothed wheel to connect said driving member and said holder.

3. In a machine of the class described, the combination of a holder adapted to hold record material, a rack fast on said holder, a gear meshing with said rack, a second gear meshing with said first mentioned gear, a toothed wheel secured to said second mentioned gear, a shaft supporting said wheel, a driving member loose on said shaft, a slidable member having a slot and pin connection with said driving member and also having an ear adapted to cooperate with said toothed wheel to connect said driving member and said holder, and a cam for operating said sliding member.

4. In a machine of the class described, the combination of a holder adapted to hold record material, a rack fast on said holder, a gear meshing with said rack, a second gear meshing with said first mentioned gear, a toothed wheel secured to said second mentioned gear, a shaft supporting said wheel, a driving member loose on said shaft, a slidable member having a slot and pin connection with said driving member and also having an ear adapted to cooperate with said toothed wheel to connect said driving member and said holder, a cam for operating said sliding member, and a second cam for operating said first cam to disconnect the sliding member from said toothed wheel at a point in its return movement which is one tooth space from its normal position.

5. In a machine of the class described, the combination of a slidable holder, operating means for said holder, means for driving said operating means, means for connecting said driving and said operating means, and automatic means for controlling said connecting means.

6. In a machine of the class described, the combination of a holder for record material having a normal horizontal position and a vertical position, means for selecting the line of the record material to receive an impression, said means being normally connected to said holder, and means operated by the holder when shifted from its horizontal to its vertical position for disconnecting said selecting means from said holder to enable the adjustment of said selecting means to select any desired line.

7. In a machine of the class described, the combination of a holder having a horizontal and a vertical position, means normally connected to said holder for selecting any desired line, means for disconnecting said selecting means when the holder is adjusted to its vertical position and to reconnect said selecting means to said holder when the holder is moved to its horizontal position, and a manual means for adjusting said selecting means when the holder is in its vertical position.

8. In a machine of the class described, the combination of a manually movable paper holder, means for securing paper thereto, a driving rack secured to said holder, a shiftable line finder normally connected to said rack, and means to disconnect said finder for shifting the same, said finder being thereafter adapted to be connected to said rack in a position opposite to any one of the lines on said paper to control the manual movement of said holder.

9. In a machine of the class described, the combination of a manually movable paper holder, means for securing paper thereto, a driving rack secured to said holder, a shiftable line finder normally connected to said rack, means to shift said finder, means cooperating with said line finder to arrest the holder in the same position with regard to the selected printing line for each adjustment thereof, means for connecting said cooperating means and line finder, means for moving the holder from its adjusted position to a printing line, and means for operating said cooperating means to disconnect said line finder from said rack to permit said latter movement of said holder.

10. In a machine of the class described, the combination of a manually movable paper holder, a line finder adapted to be connected thereto in different positions to control the manual movement of the holder, a stop cooperating with said line finder to arrest the manual movement of the holder, normally locked releasing means for the machine, and means controlled by said line finder for unlocking said releasing means as said line finder is moved against said stop.

11. In a machine of the class described, a movable paper holder, an adjustable line finder adapted to be connected thereto in several positions of adjustment, a stop for said line finder, a bank of keys for releasing the machine, means controlled by said line finder for locking out said bank of keys, and means for disabling said locking means as said line finder is moving against said stop.

12. In combination with a normally locked machine provided with releasing mechanism, a paper holder movable for line spacing purposes, and means cooperating with the releasing mechanism and the paper holder and controlled by said holder when it has been moved beyond a predetermined position for preventing a movement of said releasing mechanism.

13. In combination with a normally locked machine provided with releasing mechanism, a paper holder movable for line spacing purposes, and means cooperating with the releasing mechanism and the paper holder and operated by said holder for preventing operation of said releasing means subsequent to an operation in which the holder was moved to select the last line.

14. In combination with a normally locked machine provided with a releasing mechanism; a record material holder movable for line spacing purposes; a normally ineffective retaining device adapted to cooperate with said releasing mechanism; and means intermediate said device and said holder and operated by the latter to render said device effective when the holder moves beyond its last line spacing position.

15. In combination with a normally locked machine provided with a releasing mechanism; a record material holder movable for line spacing purposes; a normally ineffective retaining device adapted to cooperate with said releasing mechanism; and a plurality of levers operated by said holder to render said device effective to prevent movement of the releasing mechanism when the holder moves beyond its last line spacing position.

16. In combination with a normally locked machine provided with a releasing mechanism; a record material holder movable for line spacing purposes; a normally ineffective retaining device adapted to cooperate with said releasing mechanism; a stopping member on the releasing mechanism; and means intermediate said device and said holder, and controlled by the latter to move the device into the path of the stopping member to prevent movement of the releasing mechanism.

17. In a machine of the class described, the combination of a normally locked machine releasing shaft; a machine driving clutch locking member; means on said shaft to maintain said member normally effective to lock the machine; means to release said shaft; a shiftable record material holder; a device adapted to cooperate with said member; and means connected to said device, and controlled by said holder to move the device into the path of said member to prevent movement of the member.

18. In a normally locked machine, the combination of means to release the machine for operation; a movable record material holder; an adjustable line finder connected to the holder in several positions of adjustment; means cooperating with the line finder to stop the holder in a definite position; a device to lock the releasing means; and means controlled by the line finder to disable said device, when the line finder moves against its stopping means.

19. In a machine of the class described, the combination of a normally locked machine releasing mechanism; manipulative means to release said mechanism; a device normally preventing movement of said manipulative means, a movable record material holder; an adjustable line finder connected to the holder in several positions of adjustment; means cooperating with the line finder to stop the holder in a definite position; and means operated by the line finder, as it contacts its stopping means, to render the key locking device ineffective.

20. In a machine of the class described, the combination of a normally locked machine releasing mechanism; manipulative means to release said mechanism; a movable record material holder; a line finder connected to the holder; means to engage the line finder to stop the record material holder in a definite position; a device to lock said manipulative means; and means intermediate said device and the line finder, and operated by the latter, to move said device to an ineffective position as the line finder moves against its stopping means.

21. In a machine of the class described, the combination of a mechanism including a record material holder adapted to be manually and automatically adjusted; an index finger to predetermine the manual adjustment of the holder; and automatic means to move the holder from a position of manual adjustment to the printing position and back to a position in advance of the manually adjusted position.

22. In a machine adapted to make a plurality of successive operations, the combination of a movable record material holder; means to automatically give the holder shuttle movements during said multiple operations, to shift the holder from one position to the printing line and back to a position intermediate the printing line and said first-named position; and mechanism to disconnect said means from the holder at the intermediate position to line space the holder upon each shuttle movement.

23. In a machine adapted to make a plurality of successive operations, the combination of a movable record material holder; and automatic means including a plurality of driven gears, a driving wheel, operating means, and a coupling device, intermediate the operating means, and the driving wheel, to move the holder greater distances in one direction than in the other direction during the several operations of the machine to effect line spacing movements of said holder.

24. In a machine of the class described, the combination of a record material holder; an alining rack connected to the holder; a shiftable line finder normally engaging said rack; means adapted to cooperate with the line finder to stop the movement of the rack and record material holder; means on the stop adapted to enter an aperture in the line finder; and means to rock the stop to disengage the line finder from the alining rack.

25. In a machine of the class described, the combination of a manually movable record material holder; a line finder adapted to be connected thereto in different positions to control the manual movement of the carriage; an alining rack connected to the record material holder; a stop cooperating with the line finder to arrest the manual movement of the carriage in a definite position; a projection on the stop adapted to enter an aperture in the line finder, as the line finder engages the stop, at the end of the manual movement of the record material holder; and means for automatically disengaging the line finder from the alining rack and again engaging it therewith.

26. In a machine of the class described, the combination of a rockable and shiftable holder for record material; means normally connected to the holder for selecting the line of record material to receive an impression; means rocked by the rocking movement of the holder; and means connected to the selecting means, and slidably connected to the means rocked by the holder, to rock the selecting means when the selecting means is in any of its positions of adjustment.

27. In a machine of the class described, the combination of a rockable and shiftable holder for record material; a device normally connected to the holder for selecting the line of the record material to receive an impression; a link connected to the holder when the holder is in its normal position; a movable slotted member; means on the link projecting through the slotted member to rock the same to disconnect the selecting means from the holder as the holder is rocked; and a stationary slotted member to receive the means on the link to maintain the holder in its rocked position.

28. In a machine of the class described, the combination with a shiftable record material holder; a manually operable device adjustable various extents; shiftable means to move the record material holder in one direction variable extents as determined by said device; and means to operate the shiftable means to move the record material holder an invariable extent from any of its variably adjusted positions and in the same direction, and to move the record material holder an invariable extent to a lesser degree from its latter position towards its variably adjusted position.

29. In a machine of the class described, the combination with a shiftable record material holder; a manually operable device adjustable various extents; shiftable means to move the record material holder in one direction variable extents as determined by said device; means to operate the shiftable means to move the record material holder an invariable extent from any of its variably adjusted positions and in the same direction, and to move the record material holder an invariable extent to a lesser degree from its latter position towards its variably adjusted position; and means, including an automatically operable member to control the last-named invariable movement.

30. In a machine of the class described; the combination with a shiftable record material holder; means including a rack device to shift the holder in one direction variable extents; adjustable stopping means for the rack device to control the variable extents of movements of the holder; means to move the rack device from any of its variable positions of adjustment an invariable extent, first in one direction and then in another direction, the invariable extent of movement in one direction being less than that in the other direction; and means, including a cam device, to control the extents of movement of the moving means.

In testimony whereof I affix my signature.

MAXIMILIAN M. GOLDBERG.